June 30, 1959 — H. E. McGOWEN, JR — 2,892,415
GAS LIFT VALVE
Filed Nov. 18, 1955 — 2 Sheets-Sheet 1
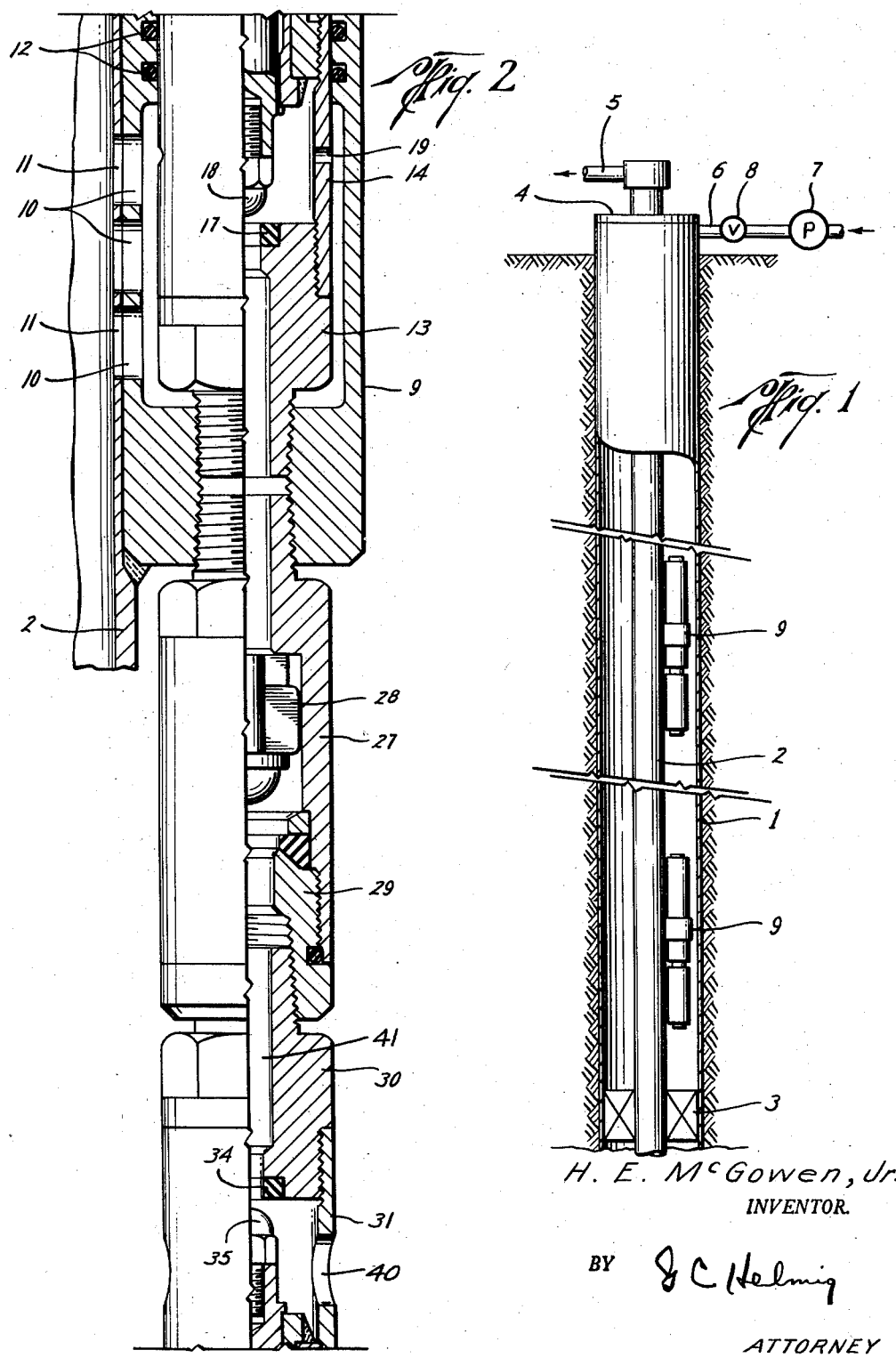
H. E. McGowen, Jr.
INVENTOR.
BY *J C Helmig*
ATTORNEY June 30, 1959   H. E. McGOWEN, JR   2,892,415
GAS LIFT VALVE
Filed Nov. 18, 1955   2 Sheets-Sheet 2
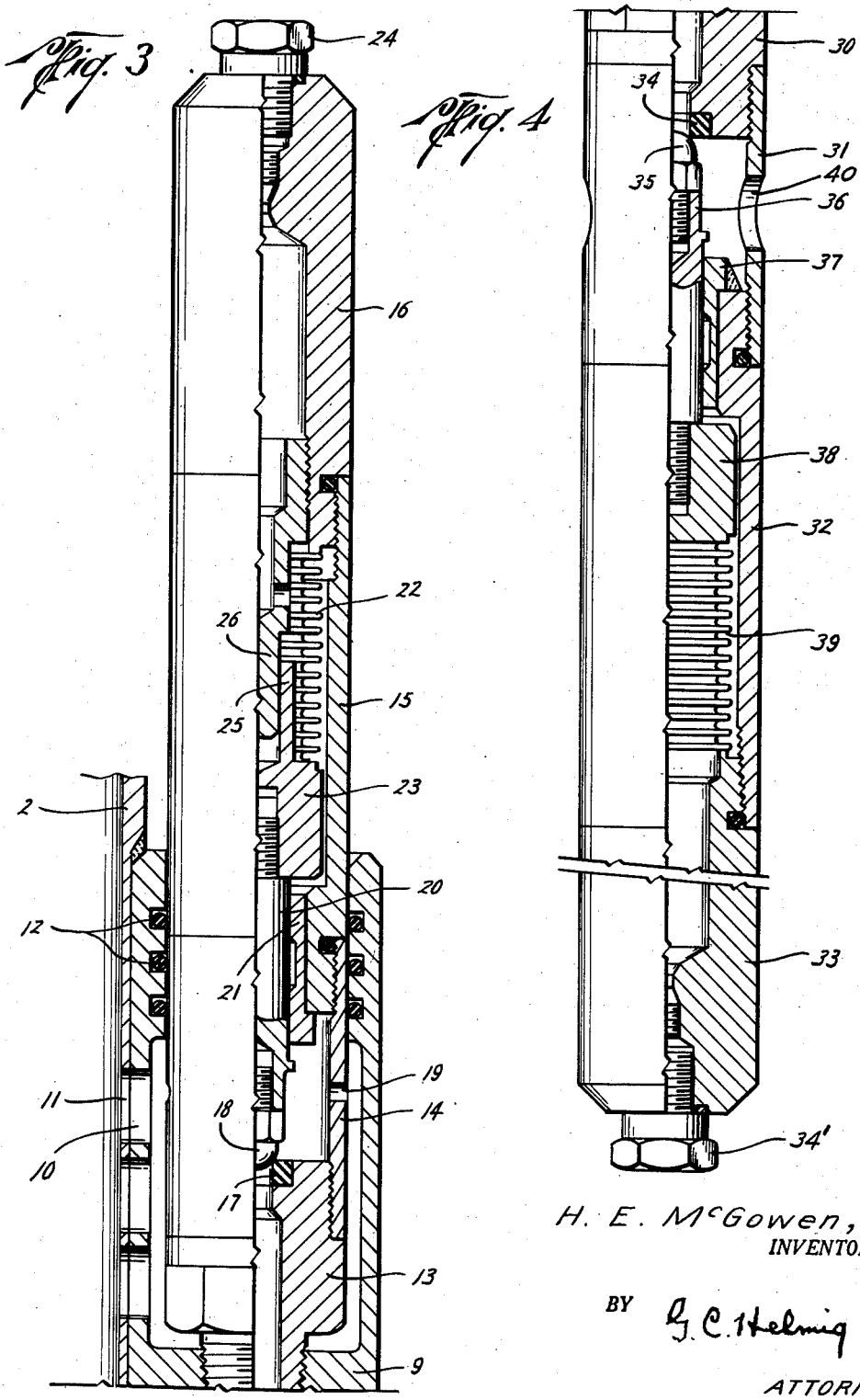
H. E. McGowen, Jr.
INVENTOR.
BY G. C. Helmig
ATTORNEY () # United States Patent Office 2,892,415
Patented June 30, 1959

2,892,415
GAS LIFT VALVE

Harold E. McGowen, Jr., Houston, Tex., assignor to Camco, Incorporated, Houston, Tex., a corporation of Texas Application November 18, 1955, Serial No. 547,640

10 Claims. (Cl. 103—232)

This invention relates to an improvement in the use and control of pressure gas to lift a liquid column such as petroleum fluid below the surface and in the production tubing of an oil well when the well is not self-flowing to the surface.

An object of the invention is to provide a gas lift pressure system having an intermittent injection cycle which is free of complicated and expensive timing devices requiring maintenance attention and which is automatically responsive at the start of an injection cycle to the build-up of a predetermined head of fluid to be produced and ready for the aid of lift gas to raise the oil or oil-gas mixture and which after the start of injection continues the supply of pressure gas for a desired length of time related to particular well conditions and the controlled rate of gas pressure drop and finally automatically cuts off injection upon a given gas pressure drop, whereupon gas pressure again builds up for the start of the next cycle as soon as the head of production fluid once more calls for lift gas injection.

A further object of the invention is to provide valved connections at one or more selected depth levels and between the pressure gas supply conduit and the conduit containing production fluid and wherein each valved connection includes a pair of valves arranged in tandem series relation and that farthermost upstream of the gas supply serving to open and to close the flow connection passage in response to lift gas pressure near the low point in the range of gas pressure variation whereby this valve is generally open and closes only for a short time when gas injection is to be ended, and the other of the tandem valves having a pressure responsive actuating device biasing the valve to closed position and having an effective surface area exposed to fluid pressure within the valved connection for opposing the valve closing biasing force and for opening the valve. The arrangement is such that when this last mentioned valve is closed the major portion of the fluid pressure receiving surface area is exposed only to the weight or pressure of that production fluid standing above the valve and only a small portion of the surface area is exposed to pressure gas, wherefore valve opening is dependent primarily on a given fluid head and cannot be effected solely by gas pressure within the controlled operating range, but after the valve has been moved away from its seat the entire pressure responsive surface area is then acted upon by the pressure gas until it sufficiently overcomes the weight of the production fluid and drops below the value of the closing biasing force of the valve actuating motor device. The closing overbalance actually is under control of the first in line of the series valves because it is arranged to close first and cut off the pressure gas flow to insure the quick closing of the valve therebeyond. Thus the first in line of the valves may be considered as a connection closing valve, and the valve second in line downstream of the direction of gas flow may be termed a connection opening valve, since its action is such that the communicating passage is opened only in response to the accumulation of a column of liquid of a volume to call for its injection.

Among the important features of this invention is the provision of related metering orifices through which the pressure gas flows and by which valve action is regulated. One such orifice is located downstream of both valves and is of a predetermined size smaller than the flow passage through the valved connection so as to restrict free discharge into the production conduit and retard sudden pressure drop of the pressure gas then active on the actuating device for maintaining open the second in line of the series valves. Another of the flow orifices is located adjacent the inlet or at what may be termed the point of replenishment supply of pressure gas to the gas delivery conduit, and its regulated size is such that the rate of replenishment flow to the conduit is somewhat less than the discharge rate of the flow restriction beyond the valves. The result is that when the valved connection is open the outflow from the gas supply conduit exceeds the inflow for a gradual pressure drop and whose rate of drop can be established beforehand, as desired, by selection of relative orifice dimensions, and upon pressure drop to a given value within the supply conduit the first in line of the tandem valves will respond to the change in pressure and approach its seat, thereby reducing gas flow therebeyond and to a volume below the outflow capacity of the discharge orifice into the production conduit, so that the actuating device for the valve farther downstream quickly closes that valve and terminates the period of gas injection. With the connection closed, pressure gas continues flowing through the smaller feed orifice into the storage supply conduit, and the pressure therein rises toward the high point in the range, and although the first in line of the tandem valves soon opens in response to pressure rise, the second in line of the valves remains closed against gas pressure, even at the maximum of its range, and the valve does not open until there has accumulated in the production conduit above the valve a sufficient head of petroleum fluid that its weight combines with the pressure gas to overcome the valve closing biasing force of its actuating motor device for a renewal of gas injection.

Other objects and advantages will become apparent during the course of the following specification having reference to a preferred embodiment as disclosed in the accompanying drawings wherein Fig. 1 is a somewhat schematic view partly in section of an oil well installation in accordance with the invention and Figs. 2, 3, and 4 are vertical sectional views on a larger scale of related fragments of a complete valve assembly.

An oil well bore usually is lined throughout its length by an outer casing 1, as seen in Fig. 1, and in which is positioned a tubing string 2, so that the interior space within the tubing and the annular space therearound constitute a pair of parallel concentric conduits either of which may be used for the upward passage of well fluid. For gas lift installations, it is often the practice to supply lift gas to the casing annulus, which may provide a fairly large storage container, and to raise the oil to the surface through the conduit provided by the tubing string. It is also customary to close off the annular space at some distance below the surface, as by means of a packer 3. The top of the casing 1 is sealed off by a suitable closure 4 through which the upper end of the production string 2 extends for connection with a suitable oil delivery conduit indicated at 5. Also at the surface, a pressure gas feed conduit 6 joins the casing annulus with a pump 7 or other source of pressure gas having a conventional pressure regulating device to limit the maximum casing pressure. An adjustable valve is shown at 8 in the supply line 6 beyond the pump, and this valve will be regulated as to the size of its open flow passage so that when the injection valve is open the flow into the casing annulus will be somewhat less than the flow from the passage into the production string. In normal choked opening, the delivery will be continuous through the valve restriction and the substitution of a fixed metering orifice of selected size is contemplated for many installations.

At one or more places within the length of the well pipes, the tubing wall will have a communicating opening for the passage of gas into the production conduit under control of the valved connection, as shown in the companion Figures 2, 3, and 4. Fig. 2 shows the connecting passage between the inside and the outside of the tubing open for gas flow, with the tandem valves lifted from their respective seats, and Figs. 3 and 4 respectively show the innermost or opening valve unit and the outermost or closing valve unit with both valves seated. As herein used the terms "innermost" and "outermost" as applied to the tandem valves refer to spaced apart valve location relative to the inside of the production conduit, it being understood that the valve which is farther downstream and nearer the production conduit is the innermost of the pair and that the other valve is the outermost of the two.

For convenience of manufacture, the valved connection is made up of a number of subassemblies, each comprising a series of co-operating parts fitted one to another. One of the subassemblies is in the form of a tubular mounting cup 9 which is mounted, as by welding, to the outside of a section of the tubing string 2. Its pocket opens upwardly to house a portion of the body containing the innermost or opening valve subassembly, and it provides a sealed chamber to receive gas discharge and which chamber has one or more openings 10 extending through the wall of the cup 9 and being aligned with corresponding openings 11 in the wall of the tubing section 2. One or more internal grooves in the top of the cup are provided to receive annular sealing rings 12 to bear against the adjoining surface of the valve body received within the pocket. This valve body or housing consists of an end to end succession of tubular elements threaded one into the other and including, as seen in the drawings, a bottom coupling 13, a sleeve 14, a sleeve 15, and an upper end cap 16. The coupling 13 terminates in a threaded nipple by which it is detachably secured within an internally threaded bore through the base of the cup 9. At its upper end it terminates in a valve seat 17 in the form of a hardened insert for co-operation with a valve tip 18 reciprocable within a valve chamber afforded by the sleeve 14. This chamber communicates through one or more ports 19 through the wall of the sleeve 14 with the annular chamber of the mounting cup 9, and the port 19, or the combined area of all ports 19 if more than one is used, affords a restricted flow path beyond the valves into the production string, and this restriction, as determined by a particular installation, is of a predetermined size such that there is no quick dumping of the pressure but rather there will tend to be a pressure differential on opposite sides of the restriction 19 such that when the flow connection is open the pressure value will remain fairly high within the chamber for the valve 18. This valve tip is replaceably secured on a sliding valve stem 20 having a bearing in a guide bushing 21 secured within the sleeve 15, and the fit of the stem and bushing affords clearance to pass gas freely into the chamber provided by the sleeve 15. Housed within the sleeve 15 is a movable wall of thin flexible metal, illustrated in the drawing as a corrugated bellows seal 22 the upper end of which is secured and sealed to the lower end of the end cap 16, and the opposite or movable end of the bellows is secured and sealed to a movable head and bellows closure 23 to which the valve stem 20 is threaded or otherwise secured for movement therewith. When the valve tip 18 moves toward and from its seat, the movement is accommodated by the flexible wall 22 and the movement occurs by reason of fluid pressure active on the exterior surfaces of the valve and bellows assembly inclusive of the bellows closure head 23 in opposition to a biasing force tending to close the valve. Such biasing force could be simply a coil spring, or conveniently is a body of compressible gas under pressure confined by the bellows to act on the interior surfaces of the expansible bellows wall and the upper side of the movable valve connected bellows closure head 23. For a volume of inert gas, such as nitrogen, in excess of that which could be contained within the interior of the bellows itself, the bellows communicates freely with the interior space within the end cap 16. The upper wall of the cap 16 carries a conventional inflation valve for the introduction of the compressible bellows actuating gas, and a protective plug 24 is threaded into the cap 16 as the closure beyond the inflating valve. Preferably the bellows closure 23 has an annular wall 25 extending upwardly within the bellows and has sliding bearing on a dependent stud 26 whose upper end is threadedly secured within the bottom of the cap 16. These co-operating parts constitute a cylinder and plunger for a dashpot action in eliminating valve chatter. And for the purpose of a hydraulic check, a small amount of liquid, such as light oil, may be introduced into the pressure chamber in addition to the compressible gas. The liquid will flow toward the bottom by gravity and tend to fill the dashpot chamber.

It will be apparent from Fig. 3 that when the valve 18 is seated by reason of the biasing force of the compressed gas sealed within the bellows, any oil standing within the production tubing 2 above the valve will be free to enter through the ports 19 and fill the valve chest. The weight or head of such oil column acting on the exterior surfaces of the bellows and movable valve parts exposed above the seat 17 constitutes a force tending to contract the bellows in opposition to the valve closing force. If for any reason the pressure head of production fluid greatly exceeds the pressure of the lift gas and is sufficient to move the valve 18 to an open position, as shown in Fig. 2, then to preclude the oil moving into the annulus, it will be desirable to provide a check valve against the back flow of oil. A check valve subassembly unit is shown in Fig. 2, and this consists simply of a conventional type of check valve having a body or housing 27 containing a gravity operated valve 28 for co-operation with an annular seat 29 threadably received within the bottom of the sleeve 27. The upper end of the sleeve contains a threaded tip for securement within the base of the mounting cup 9 opposite to and in alignment with the coupling tip of the other valve.

The bottom or closing valve unit is constructed generally similar to the opening valve unit but is upside down in relation to the opening unit and its valve opens opposite to the upstream direction of gas flow and its operating motor is responsive to casing annulus pressure. More specifically, its cylindrical body includes a coupling tube 30, a valve enclosing sleeve 31, a bellows enclosing sleeve 32, and a terminal hollow cap 33, each threaded in end succession one to another. The terminal coupling 30 has an end coupling nipple threaded into the valve seat element 29 of the check valve but the nipple could be threaded directly into the base of the cup 9 if for any reason the use of a check valve is not required. The coupling 30 also provides a valve seat which conveniently is a replaceable insert ring, as shown at 34. A co-operating outwardly opening valve tip 35 is carried by the reciprocatory stem 36 having a loose slide bearing fit in the bushing 37 soldered or otherwise secured in the tubular body 32. The movable stem 36 in turn is fixed to the closure head 38 on the free end of the spring metal bellows or movable wall 39 whose opposite end is fixedly mounted with the cap 33 and whose interior space co-operates with and is supplemented by the chambered space within the cap 33 and to which compressible gas is supplied through an inflating valve sealed off by the plug 34'. The trapped gas is an elastic force which tends to expand the bellows for moving the valve tip 35 toward its seat in opposition to casing pressure. Clearance between the aforementioned loosely fitted stem 36 and bushing 37 along with large and unrestricted flow inlet openings 40 in the wall of the valve cage sleeve 31 provide that the spring bellows contracting force will be that of the annulus pressure. Annulus gas pressure on the exposed areas of the valve and bellows assembly in opposition to the bellows entrapped elastic gas controls travel of the valve tip 35 toward and from its seat 34 in direct relation to variations in annulus pressure. Preferably, the fit of the valve and its seat is a somewhat sloppy one so that pressure gas can leak by for action on the entire tip area of the valve 35 at all times. The biasing force exerted by the gas confined within the bellows 39 for closing the outermost valve 35 of the tandem valves should be somewhat in excess of the closing force of the gas confined within the bellows 22 for biasing the opening valve 18 to closed position. This will insure that casing annulus gas pressure drop will first allow a closing response of the valve farther upstream.

As an example of a suitable range of operating pressures, pressure of the actuating gas within the bellows 39 for closing the valve 35 may be such that elastic bellows pressure will be overcome when the annulus pressure as measured near the surface of the well is around 500 pounds per square inch and the control of gas supplied to the annulus is such that annulus pressure at the surface will not exceed 540 pounds per square inch. Since elastic closing force on the valve 18 is less than the closing force at which the valve 35 is set, the open valve 18, as seen in Fig. 2, will remain fully open when pressure on the exterior of the bellows and valve assembly above the seat 17 is somewhat less than the mentioned 500 pounds per square inch. However, when the valve 18 is seated as in Fig. 3, the closing pressure of its bellows is sufficient to resist maximum casing pressure of 540 pounds per square inch exerted solely on the small valve tip area exposed below the seat 17 and in the absence of supplemental opening pressure of a head of tubing production fluid above the seat 17 and active on the spring bellows. Now, assuming both valves 18 and 35 are held open by annulus gas pressure in excess of valve closing forces, the first in line valve 35, having a higher closing pressure, will respond to annulus pressure reduction for movement from open position in advance of the closing response of the second in line valve 18. Throughout the injection period, annulus gas pressure continually decreases because the inlet orifice 8 is smaller than the outlet orifice 19 and as the injection pressure approaches 500 pounds per square inch, the valve 18 does not immediately respond but remains fully open and the valve 35 is the first to close. In moving toward its seat, the valve 35 finally restricts gas flow therebeyond that gas pressure around the bellows 22 sharply drops for a quick closing of the valve 18 to terminate the gas injection phase of the cycle. With both valves seated, annulus pressure immediately builds up and soon rises above 500 pounds per square inch to again move the valve 35 away from its seat but annulus pressure in the passage 41 beyond the open valve 35 can now act only on the confined tip area of the seated valve 18 below its seat 17 and is cut off from reaching the larger valve areas above the seat 17. Annulus pressure alone acting on that relatively small valve tip is insufficient even at the maximum of 540 pounds per square inch casing pressure to overcome the opposing force of compressed gas confined within and active on the relatively large interior area of the bellows 22.

During the noninjection phase of the cycle, well fluid may rise in the production tubing 2 and the head of liquid higher than the injection control unit acts on the exterior surfaces of the bellows and valve assembly above the closed seat 17 against the yieldable valve seating force. As soon as the head of the fluid is of a height to justify its being lifted as determined beforehand, its weight will then cause bellows contraction and the opening of the valve 18. Pressure gas will then flow freely through the relatively large inlet port 40 and connecting passage 41 and out through the relatively smaller metering ports 19 for aerating and lifting the liquid column but a back pressure will be maintained ahead of the orifices 19 sufficient to continue bellows collapse so long as the outermost valve 35 remains open. Outflow of pressure gas through the metering orifices 19 upon tubing flow resistance decrease is at a rate which exceeds the inflow of gas past the metering orifice 8 into the casing annulus; wherefore annulus pressure will diminish toward the predetermined lower limit, and since the closing force acting on the valve 35 is greater than that of the closing force acting on the valve 18, the outermost valve 35 will first respond to the pressure reduction and as the pressure drops to around 500 pounds per square inch, the valve will close off further flow to an amount less than the volume of the metering restrictions 19; whereupon the valve 18 will now move to its seat to completely cut off further gas flow. The buildup of casing annulus pressure will now proceed again but no outflow can occur until a sufficient head of production fluid has been built up to warrant the repetition of the gas injection as previously described. Should any of an installation of several vertically spaced apart flow control units remain closed for lack of tubing pressure thereon, the operation sequence will take place at the next lower unit so long as production fluid exerts influence thereon.

An important advantage of the double valve is that it enables accurate control of the spread or range of pressures at which the valves respond and makes for an automatic delivery of the correct volume of gas necessary to lift the fluid head to the surface with maximum efficiency. It also automatically preselects the desired quantity of production fluid, or fluid head. In operation, the valve is signaled to open the connection whenever the correct quantity of petroleum fluid accumulates above the valve. An efficient operation, therefore, results because the entire cycle of fluid head and quantity of high pressure injection gas is automatic and there is eliminated the need of attention from surface controls, which does away with human error in the gas lift operation.

Furthermore, the valve allows loading of the annular space in the well casing with injection gas to a high pressure and when the valve is signaled to open by the accumulated fluid head, the storage space is drained of gas until the lowered pressure causes valve closing. Accordingly, the gas lift problem is much easier in closed cycling systems, since the compressors load the annulus of the casing as a reservoir of high pressure gas between cycles of gas injection and there results a much smoother and more continuous operation for the compressors. By comparison with standard gas lift operation with gas injection controlled from the surface, the only high pressure storage space available is that within the relatively small field lines, so that there tends to occur erratic peaks of demand on the compressors, which makes a small closed cycle system difficult to handle and usually the minimum number of wells that can be hooked together under such circumstances is seven or eight wells. With the present arrangement, there is no such limit. In the operational example herein referred to, the valve spread is on the order of 40 pounds per square inch but that can be increased or decreased for any particular well and adjustments are made at the surface through the selection of the feed choke and control of the compressor or pump output as related to selected outlet constriction of the valved passage and preset closing pressures of the closure biasing forces, to produce the desired casing pressure buildup necessary for lifting the fluid to the surface with maximum efficiency.

While the foregoing description has dealt only with a single embodiment, it will be understood that various modifications may be made as come within the scope of the appended claims.

What is claimed is:

1. In the production of an oil well by the intermittent injection of pressure gas into an oil column, parallel well bore conduits for oil flow toward the surface and for pressure gas flow from the surface respectively, means having a passage communicating one of said conduits with the other at a selected distance below the surface, a pair of spaced apart valve seats within said passage, valves movable toward and from said seats in controlling gas flow through said passage and arranged in tandem gas flow controlling relation, biasing means acting on each valve to urge it to closed position, the first of said valves having a surface area exposed to pressure gas within the gas conduit and being movable in response to pressure on said surface area to open the valve in opposition to the valve closing force of said biasing means, the second of said valves being downstream of the first valve in relation to the direction of gas flow through said passage and having a surface area exposed to the head of oil in the oil conduit thereabove and being movable in response to pressure thereon for opening the valve against the force of said biasing means whenever such head of oil exceeds a predetermined value, a gas flow restriction in said passage on the downstream side of said second of said valves and serving when the valves are open to retard gas pressure drop ahead of said restriction for a continued valve opening action by gas pressure on said exposed area, means to supply pressure gas to the gas conduit at a rate less than the rate of pressure gas flow through said restriction so that a gradual pressure drop in the gas conduit will occur when both valves are open and eventually reach a level to allow the first valve to close and suddenly cut off pressure gas flow to the second valve.

2. A flow control system for oil wells or the like including an oil production conduit, a pressure gas delivery conduit, means provided with a gas injection passage intercommunicating said conduits and having an orifice of predetermined area for retarding pressure drop of gas flowing through the passage immediately ahead of the orifice, means supplying pressure gas continuously to said delivery conduit at a rate restricted in relation to the flow capacity of said orifice, a pair of valve seats in said passage, valves co-operating with said seats to control flow through the passage and being arranged in series relation to one another in the upstream path of pressure gas flow toward said passage orifice, pressure responsive means exposed to and actuatable by pressure gas on the upstream side of both valves and operatively connected with the valve farther upstream in said passage from said orifice so as to open the last mentioned valve upon actuation of said pressure responsive means, other pressure responsive means exposed for action thereon by pressure fluid in the passage between said passage orifice and the valve closest thereto and operably connected with the last mentioned valve to open the same and force exerting means active on both valves to bias them toward closed positions with a closing force on the valve farther from the passage orifice greater than the closing force on the valve nearer to said passage orifice.

3. In a flow control unit of the character described, a flow passage having a choked outlet, a main valve in said passage upstream of said choked outlet, yieldable means active on the valve to urge it to passage closing position, a fluid pressure responsive element in the passage between the valve and said choked outlet operative for holding said main valve open in opposition to said yieldable means, a second flow control valve in the passage in series line relation to and upstream of said main valve, yieldable means active on the second valve to urge it to position for restricting fluid flow through the passage to a greater extent than does said choked outlet and a fluid pressure responsive element exposed to pressure fluid upstream of said second valve and operative on the second valve to hold the same open in opposition to the last mentioned yieldable means, the flow area of said choked outlet being less than the flow area upstream thereof within the passage when both valves are fully open and said pressure responsive elements and the yieldable means for the two valves in relation to one another being such that the occurrence, at any time when both valves are in open position, of a pressure drop of the fluid flowing through the passage first influences movement of the second valve from open position before the main valve closes.

4. In a fluid flow control unit having a flow passage for fluid to be controlled, a pair of valve subassemblies each comprising a body having an inlet and an outlet, a valve between the inlet and outlet controlling fluid flow from one to the other, a fluid variable volume chamber on one side of the valve having a movable chamber wall responsive to fluid pressure in the chamber and connected with the valve to operate the same with chamber wall movement, yieldable means active to bias said movable wall to valve closing position against chamber fluid pressure on the movable chamber wall and means joining the outlet of one subassembly with the inlet of the other subassembly and thereby affording said flow passage through both subassemblies and which passage extends from the inlet of said one subassembly to the outlet of said other subassembly and has the valves of the two subassemblies in passage downstream series relation one to another, the inlet of said one subassembly communicating with its variable volume chamber on the valve side of the movable chamber wall to thus expose the wall to inlet fluid pressure in opposition to the valve closing bias of said yieldable means and the outlet of said other subassembly communicating with its variable volume chamber on the valve side of the movable wall to expose that wall to outlet fluid pressure in opposition to the valve closing bias of said yieldable means.

5. In a control unit as described in claim 4 wherein the yieldable means for biasing the valve of said one subassembly exerts more valve closing force than does the yieldable means of said other subassembly and the outlet of said other subassembly includes a flow restriction of lesser flow area than in the upstream portion of the flow path in the unit when both valves are in their open positions.

6. In a flow control unit for gas lift of well fluids, a housing having a flow passage including a pair of valve ports in series relation, a fluid pressure responsive valve having a leaky fit to the outermost valve port and responsive to the pressure of fluid upstream thereof, a fluid pressure responsive valve for the innermost valve port having a portion of its effective pressure area exposed at the valve port to upstream fluid pressure and another portion of said pressure area located beyond the valve port for exposure to pressure fluid downstream thereof and means beyond said innermost valve port restricting the outflow from said passage and effecting a pressure differential on opposite sides of the restricting means.

7. The unit of claim 6 wherein the innermost valve is provided with vibration damping means.

8. A gas lift valve unit including means provided with a flow passage having an inlet and an outlet and a pair of valve ports in series relation between said inlet and said outlet and said outlet being restricted in relation to the flow area of the passage in advance thereof to effect a pressure differential on opposite sides of the restricted outlet during normal pressure fluid flow and separate closures for said ports comprising a fluid pressure responsive actuator located in the passage space between said restricted outlet and the last in line of said ports to control the closure thereof and a fluid pressure responsive actuator located in advance of the first in line port and arranged to close the same in response to fluid pressure reduction of a lesser value than will effect the port closing action of the first mentioned fluid pressure actuator.

9. In a well flow system, a well production conduit, a gas supply conduit, means to supply gas under pressure at a controlled rate to said supply conduit and a valve unit for controlling gas flow to the well production conduit and from the gas supply conduit, said unit comprising a housing having a passage for communication with the well production conduit through a restricted port whose flow area is less than that of the passage to create a pressure differential on opposite sides thereof and is greater than the rate of flow at which gas is fed to the supply conduit, a pair of valve ports arranged in series relation within the passage ahead of said restricted port, a valve for closing the valve port nearer said restricted port and whose port closing area is exposed to the stream of pressure gas, a movable wall operatively connected with said valve and located in the passage space between the last mentioned valve port and said restricted port and whose area is exposed to pressure fluid within said space and said wall being responsive to pressure action on the combined areas to move the same to valve opening position, a valve having a leaky closed fit to the other valve port and a pressure responsive movable wall connected with the last mentioned valve and exposed to pressure gas within said supply conduit for opening said last mentioned valve when said pressure gas acting on the combined areas of the last mentioned valve and its connected pressure responsive wall exceeds a predetermined value and for closing the same when said pressure gas falls below said predetermined value.

10. In a gas lift system of the character described, an oil producing conduit, a gas conduit to which pressure gas is constantly supplied, pressure gas supply means communicating with said conduit and having a flow port of given flow capacity through which the constant supply of gas to the conduit is metered, a gas flow control unit provided with a gas flow passage having an inlet leading thereto from said gas conduit and an outlet leading from the passage to said oil producing conduit and having a flow port whose capacity is greater than the first mentioned flow port and is restricted in relation to the area of said passage so as to provide a pressure drop thereacross during pressure gas flow therethrough, a pressure responsive device in the passage between said inlet and said outlet including a passage closure valve presenting a surface against which pressure gas is effective against valve closing movement and a valve connected movable wall located on the outlet surface supplementary to said valve surface, yieldable means biasing the valve to passage closing position with a predetermined force equal to the combined forces of pressure gas active on said valve surface and of a given fluid head active on said movable wall surface and pressure responsive valve means in the passage in upstream relation to said valve and responsive to gas pressure at the passage inlet above and below a pressure less than that required to maintain said valve open against its biasing force and operative to open and close said passage in advance of said valve.

References Cited in the file of this patent

UNITED STATES PATENTS

| | | |
|---|---|---|
| 2,634,689 | Walton | Apr. 14, 1953 |
| 2,642,812 | Robinson | June 23, 1953 |